(12) United States Patent
Ran et al.

(10) Patent No.: US 11,180,204 B2
(45) Date of Patent: Nov. 23, 2021

(54) AUTONOMOUS TRACK-TYPE MOVING DEVICE

(71) Applicant: Positec Power Tools (Suzhou) Co., Ltd., Jiangsu (CN)

(72) Inventors: Yuanzhong Ran, Suzhou (CN); Kang Song, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 356 days.

(21) Appl. No.: 16/171,409

(22) Filed: Oct. 26, 2018

(65) Prior Publication Data
US 2019/0118877 A1    Apr. 25, 2019

Related U.S. Application Data

(63) Continuation of application No. PCT/CN2017/082276, filed on Apr. 27, 2017.

(30) Foreign Application Priority Data

Apr. 27, 2016 (CN) .................. 201620366975.0
Jul. 12, 2016 (CN) .................. 201610545658.X

(51) Int. Cl.
| | |
|---|---|
| *B62D 55/065* | (2006.01) |
| *B62D 55/30* | (2006.01) |
| *B62D 55/24* | (2006.01) |
| *A01D 34/835* | (2006.01) |

(52) U.S. Cl.
CPC ......... *B62D 55/065* (2013.01); *A01D 34/835* (2013.01); *B62D 55/242* (2013.01); *B62D 55/244* (2013.01); *B62D 55/30* (2013.01)

(58) Field of Classification Search
CPC .............................. B62D 55/30; B62D 55/305
See application file for complete search history.

(56) References Cited

U.S. PATENT DOCUMENTS

| | | | | |
|---|---|---|---|---|
| 2,284,821 | A | * | 6/1942 | Heaslet ................. B62D 55/30 305/154 |
| 4,279,318 | A | * | 7/1981 | Meisel, Jr. ........... B62D 55/305 180/9.64 |
| 5,011,460 | A | | 4/1991 | Ouchi et al. |
| 5,045,030 | A | * | 9/1991 | Cunningham ........ F16H 7/1263 474/138 |

(Continued)

FOREIGN PATENT DOCUMENTS

| | | |
|---|---|---|
| AU | 199066441 | 6/1991 |
| AU | 199230779 | 6/1993 |

(Continued)

OTHER PUBLICATIONS

State Intellectual Property Office of the P.R. China, International Search Report and Written Opinion (English Translation included) for PCT/CN2017/082276 dated Jul. 13, 2017, 9 pages.

*Primary Examiner* — Tony H Winner
(74) *Attorney, Agent, or Firm* — Middleton Reutlinger

(57) ABSTRACT

A track-type moving device having one or more track mechanisms. The track mechanism may include a guide wheel, a driving wheel, a track, and/or a tensioning mechanism. The tensioning mechanism may include an adjusting member and/or an elastic member. The elastic member may provide a driving force that enables the adjusting member to move.

13 Claims, 7 Drawing Sheets

(56) References Cited

U.S. PATENT DOCUMENTS

| | | | |
|---|---|---|---|
| 5,352,029 A | 10/1994 | Nagorcka | |
| 5,518,459 A | 5/1996 | Sakai et al. | |
| 5,702,315 A | 12/1997 | Sakai et al. | |
| 7,866,420 B1 | 1/2011 | Claas et al. | |
| 8,523,298 B2 * | 9/2013 | Braun | B62D 55/305 |
| | | | 305/146 |
| 9,334,001 B2 | 5/2016 | Lussier et al. | |
| 9,567,022 B2 | 2/2017 | Feldmann | |
| 9,637,187 B2 | 5/2017 | Okada | |
| 9,789,918 B2 * | 10/2017 | De Palma | B62D 55/305 |
| 10,246,150 B2 * | 4/2019 | Pizon | B62D 55/15 |
| 10,272,961 B2 * | 4/2019 | Wolf | B62D 55/084 |
| 2008/0258550 A1 | 10/2008 | Webster | |
| 2009/0072617 A1 * | 3/2009 | Alfthan | B62D 55/305 |
| | | | 305/146 |
| 2009/0273233 A1 * | 11/2009 | Tokach | B62D 55/305 |
| | | | 305/146 |
| 2012/0242143 A1 | 9/2012 | Feldmann | |
| 2015/0042153 A1 | 2/2015 | Lussier et al. | |
| 2015/0321712 A1 | 11/2015 | Okada | |
| 2016/0311481 A1 * | 10/2016 | Grant | B62D 55/30 |
| 2017/0217517 A1 * | 8/2017 | Bandil | B62D 55/06 |
| 2018/0118290 A1 * | 5/2018 | Vik | B62D 55/30 |

FOREIGN PATENT DOCUMENTS

| | | |
|---|---|---|
| CN | 2667866 | 1/2005 |
| CN | 201045051 | 4/2008 |
| CN | 201107902 | 9/2008 |
| CN | 201217459 Y | 4/2009 |
| CN | 201961404 | 9/2011 |
| CN | 202663802 U | 1/2013 |
| CN | 103387015 A | 11/2013 |
| CN | 104411572 A | 3/2015 |
| CN | 204415553 U | 6/2015 |
| CN | 105191564 A | 12/2015 |
| CN | 105340439 A | 2/2016 |
| DE | 102012018615 A1 | 3/2014 |
| EP | 2327610 | 6/2011 |
| EP | 2946650 | 8/2017 |
| EP | 2502807 | 7/2018 |
| EP | 2873594 | 10/2018 |
| ES | 2380889 | 5/2012 |
| ES | 2649184 | 1/2018 |
| FR | 3020915 | 4/2016 |
| GB | 2230319 | 10/1992 |
| GB | 2280724 | 2/1995 |
| JP | 2000188919 A | 7/2000 |
| JP | 2014015156 | 1/2014 |
| KR | 20110114167 A | 10/2011 |
| KR | 20120099964 | 9/2012 |
| PT | 2946650 | 12/2017 |
| WO | 9107306 | 5/1991 |
| WO | 1991007306 | 5/1991 |
| WO | 9311022 | 6/1993 |
| WO | 1993011022 | 6/1993 |
| WO | 2011129572 | 1/2012 |

* cited by examiner

AUTONOMOUS TRACK-TYPE MOVING DEVICE

BACKGROUND

Technical Field

The present invention relates to the field of autonomous moving devices, and particularly, to an autonomous track-type moving device.

Related Art

As a mechanical tool for mowing vegetation, a lawn mower comprises a cutter head, a motor, a walking mechanism, and in some cases a hand rail. A blade is mounted on the cutter head, an output shaft of the motor is connected to the blade on the cutter head, and the blade is driven by the motor rotating at a high speed to mow a lawn, thereby achieving high working efficiency, saving working time of a lawn-mowing worker, and reducing a large amount of human resources. Compared with a common lawn mower, a track-type lawn mower can reduce a grounding pressure, protect vegetation, and resolve a problem that it is difficult to mow a lawn on a slope.

SUMMARY

Tracks, driving wheels, and guide wheels of a conventional track-type lawn mower are all visible, and when the track-type lawn mower is working, a user may be squeezed by motion between the tracks and the driving wheels and motion between the tracks and the guide wheels due to an incorrect operation. The same problem also occurs on other autonomous moving device using a track transmission mechanism. In view of the above, it is necessary to provide an autonomous track-type moving device having a protective mechanism, to resolve a problem that a common autonomous track-type moving device will cause a mechanical harm.

An autonomous track-type moving device, wherein the autonomous track-type moving device automatically walks and works in a predetermined working area, and comprises a base, a track mechanism, and a protective mechanism, the track mechanism comprises a guide wheel, a driving wheel, and a track, the guide wheel and the driving wheel are located on two sides of the base, the track is wound around the guide wheel and the driving wheel, an area in which the track is wound on or off the guide wheel/the driving wheel is defined as a dangerous area, and the protective mechanism is configured to prevent the track mechanism from harming a user in the dangerous area.

In an embodiment, the protective mechanism comprises at least one sensor, a sensing area of the sensor covers at least the dangerous area, and when the sensor senses that a foreign object approaches the dangerous area, the autonomous track-type moving device controls the track mechanism to stop motion.

When the foregoing autonomous track-type moving device works, a track mechanism moves, and the exposed track mechanism may cause a mechanical harm to an operator. A sensor can send a sensing signal to a controller when a human body approaches a dangerous area, and after receiving the sensing signal, the controller immediately sends a stop instruction to a walking motor, to ensure that the track mechanism stops working when the human body approaches the dangerous area, and prevent the track mechanism from harming the human body in the dangerous area.

In an embodiment, the sensor is at least one of an infrared sensor, an ultrasonic sensor, a capacitance sensor, and a laser sensor.

In an embodiment, the protective mechanism comprises a first protective cover plate, and the first protective cover plate is disposed on one side of the track mechanism away from the base to shield the dangerous area.

When the foregoing autonomous track-type moving device works, the track mechanism moves, and the exposed track mechanism may cause a mechanical harm to an operator. A first protective mechanism is disposed on one side of the track mechanism far away from a base, to protect an operator and prevent the operator from being squeezed by the track mechanism, so that the operator can use the autonomous track-type moving device safely and avoid a mechanical harm caused by an incorrect operation.

In an embodiment, a cutting apparatus is disposed at a bottom of the base, the cutting apparatus stretches toward two sides of the base, and the first protective cover plates are further configured to shield the cutting apparatus.

In an embodiment, the first protective cover plate is located between the guide wheel and the driving wheel, and extends from the guide wheel to the driving wheel.

In an embodiment, the first protective cover plate is a strip-shaped plate with two arc-shaped ends, and the arc-shaped ends of the first protective cover plate match edges of the guide wheel and the driving wheel.

In an embodiment, the first protective cover plate is a track protective cover plate, the track protective cover plate is located on outer edges of the driving wheel and the guide wheel, and located between the driving wheel and the guide wheel.

In an embodiment, one end of the track protective cover plate is an arc-shaped end, the arc-shaped end matches an edge of the guide wheel or the driving wheel, there are four track protective cover plates, and the four track protective cover plates are respectively located on outer sides of each of the driving wheels and each of the guide wheels.

In an embodiment, a cutting apparatus is disposed at a bottom of the base, the cutting apparatus stretches toward two sides of the base, and the protective mechanism comprises a second protective cover plate for shielding the cutting apparatus.

In an embodiment, the second protective cover plate is a cutting apparatus protective cover plate, the cutting apparatus protective cover plate is disposed on a side of the base from which the cutting apparatus stretches outward, and is located between the driving wheel and the guide wheel, to shield the cutting apparatus on the base.

In an embodiment, the second protective cover plate is a hollow casing and the cutting apparatus is located in an accommodation cavity formed by the casing.

In an embodiment, the autonomous track-type moving device comprises a controller configured to control the autonomous track-type moving device to automatically walk and work, a cutting motor, and a walking motor, the controller is disposed in the base and controls rotation of the cutting motor and the walking motor, and the track is driven by the walking motor to drive the autonomous track-type moving device to walk.

Embodiments of the present invention further provide a track mechanism, including a base; a driving wheel, disposed on the base rotatably; a guide wheel, configured to support the base together with the driving wheel and disposed movably relative to the base; a track, wound around the driving wheel and the guide wheel for a circle, to perform rotary motion around the driving wheel and the guide wheel; and a tensioning mechanism, including an adjusting member connected to the guide wheel to change a position of the guide wheel and an elastic member located between the adjusting member and the base, the elastic member provides a driving force that enables the adjusting member to move, and the adjusting member drives the guide wheel to move and tension the track.

For the track mechanism, the guide wheel is connected to the adjusting member, when the track becomes loose, the elastic member provides a driving force that enables the adjusting member to move, and the adjusting member drives the guide wheel to move and tension the track, thereby automatically tensioning the track in real time and prevent the track from falling off.

In an embodiment, the elastic member provides an elastic force that enables the adjusting member to perform linear motion or swinging motion relative to the base, and when the adjusting member is moving, the adjusting member drives the guide wheel to perform linear motion or swinging motion.

In an embodiment, the elastic member provides a pushing force or a pulling force that enables the adjusting member to move.

In an embodiment, when the elastic member drives the adjusting member and drives the guide wheel to move, a wheel center distance between the guide wheel and the driving wheel is increased.

In an embodiment, the bottom of the driving wheel and the bottom of the guide wheel are on a same horizontal plane.

In an embodiment, the guide wheel and the adjusting member are connected rotatably through a rotating shaft.

In an embodiment, the adjusting member has a guide shaft that is slidably cooperating with the base in a linear direction, the elastic member is disposed on the guide shaft, and two ends of the elastic member are pressed by the adjusting member and the base respectively.

In an embodiment, the adjusting member is rotatably connected to the base, the guide wheel is rotatably connected to the adjusting member, and a rotating axis of the adjusting member on the base and a rotating axis of the guide wheel on the adjusting member are set eccentrically.

In an embodiment, the adjusting member includes a first support shaft rotatably supported on the base, a second support shaft rotatably supported on the guide wheel, and a connecting rod connecting the first support shaft and the second support shaft.

In an embodiment, the elastic member is a torsion spring disposed on the first support shaft, and two ends of the torsion spring bear against the connecting rod and the base respectively.

In an embodiment, the elastic member is connected between the connecting rod and the base.

In an embodiment, a motor for driving the driving wheel to rotate is further disposed on the base.

In an embodiment, the track has an elastic telescopic capability.

In an embodiment, the track is a series closed-loop structure formed by a plurality of rubber blocks hinged through metal pins.

A lawn mower having the foregoing track mechanism is further provided, and the lawn mower further includes a lawn mowing mechanism located at the bottom of the base.

In an embodiment, the track has a flexible material on one side in contact with the ground.

DETAILED DESCRIPTION

To understand the present invention conveniently, the present invention will be described more comprehensively with reference to the relevant accompanying drawings. The accompanying drawings show preferred embodiments of the present invention. However, the present invention can be implemented in many different forms and is not limited to the embodiments described herein. On the contrary, the embodiments are provided to make the disclosure of the present invention be understood more comprehensively and thoroughly.

It should be noted that, when an element is described as "being fixed to" another element, the element can be fixed to the another element directly or through an intermediate element. When an element is described as "being connected to" another element, the element can be connected to the another element directly or through an intermediate element. The terms "vertical", "horizontal", "left", "right", and other similar expressions used herein are only for illustration.

Unless otherwise defined, all technical and scientific terms used herein have the same meanings as those understood by a person skilled in the art. The terms in the specification of the present invention are only used to describe the specific embodiments, rather than limiting the present invention. The term "and/or" herein includes any or all combinations of one or more related listed items.

Figure 1:
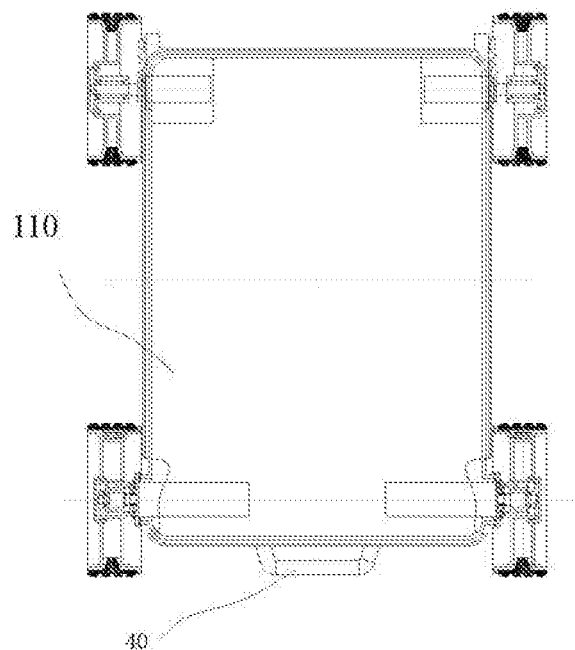
FIG. 1 is a schematic diagram of a front side of an autonomous track-type moving device according to an embodiment of the present invention.
Figure 2:
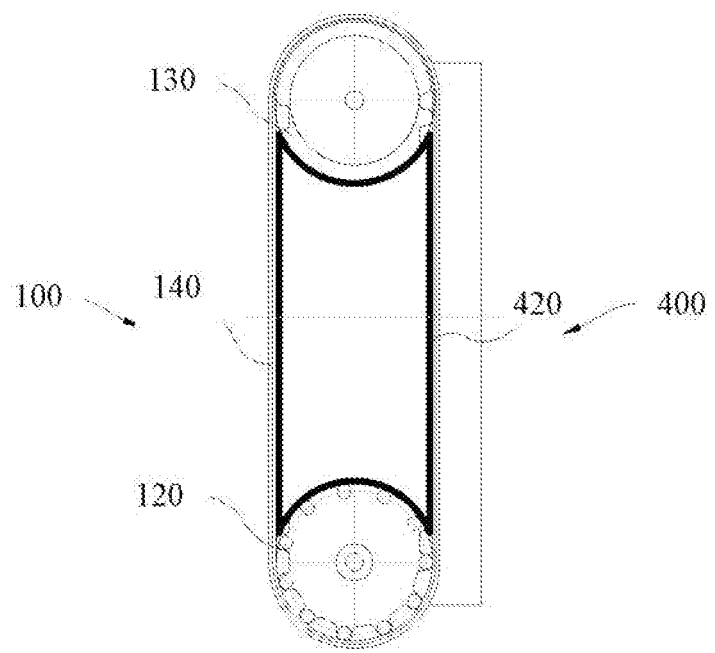
FIG. 2 is a schematic diagram of a lateral side of the autonomous track-type moving device in FIG. 1.

As shown in FIG. 1 and FIG. 2, an autonomous track-type moving device in the present embodiment automatically walks and works in a predetermined working area, for example, a track-type device such as a track-type lawn mower, a track-type snowplow, or a track-type fallen leaf collecting device, and in the present embodiment, the track-type lawn mower is used as an example. The track-type lawn mower includes a base 110, track mechanisms 100, and a protective mechanism 400. The track mechanism 100 includes a guide wheel 130, a driving wheel 120, and a track 140. The guide wheels 130 and the driving wheels 120 are located on two sides of the base 110, and the tracks 140 are wound around the guide wheels 130 and the driving wheels 120. In an implementation, the protective mechanism 400 includes a first protective cover plate 420, the first protective cover plate 420 is disposed on one side of the track mechanism 100 away from the base 110, and is configured to shield an area in which the track 140 is wound on or off the guide wheel 130/driving wheel 120, and the area is defined as a dangerous area 101.

When the track-type lawn mower is working, the tracks 140 move in cooperation with the guide wheels 130 and the driving wheels 120, and the exposed tracks 140, guide wheels 130, and driving wheels 120 may cause a mechanical harm to an operator. Therefore, the first protective cover plate 420 is disposed on one side of the track mechanism 100 away from the base 110, to protect an operator and prevent an operator from being squeezed by engagement of the track 140 and the guide wheel 130/driving wheel 120, and avoid a mechanical harm caused by an incorrect operation, so that the operator can use the track-type lawn mower safely.

In this specific embodiment, a cutting apparatus (not shown in the figure) is disposed at a bottom of the base 110, the cutting apparatus stretches toward the two sides of the base 110, the first protective cover plate 420 is further configured to shield the cutting apparatus on the base 110. When the track-type lawn mower works, the track-type lawn mower drives the cutting apparatus to move, the exposed cutting apparatus may harm an operator, and the first protective cover plate shields the cutting apparatus and prevents body parts such as hands and feet from reaching the cutting apparatus, to protect an operator. It can be understood that, the cutting apparatus may be a blade or a trimmer line, and this is not limited herein.

Specifically, the first protective cover plate 420 is located between the guide wheel 130 and the driving wheel 120, and extends from the guide wheel 130 to the driving wheel 120, and the first protective cover plate 420 is fixed relative to the base 110. The first protective cover plate 420 directly seals the sides of the tracks 140, to prevent body parts such as hands from being drawn into the guide wheels 130, the driving wheels 120, or the cutting apparatus on the base 110, and avoid, through a structural design, a mechanical harm caused by an incorrect operation of an operator.

Furthermore, the first protective cover plate 420 is a strip-shaped plate with two arc-shaped ends, and the two arc-shaped ends of the first protective cover plate 420 respectively match the edges of the guide wheel 130 and the driving wheel 120.

Figure 3:
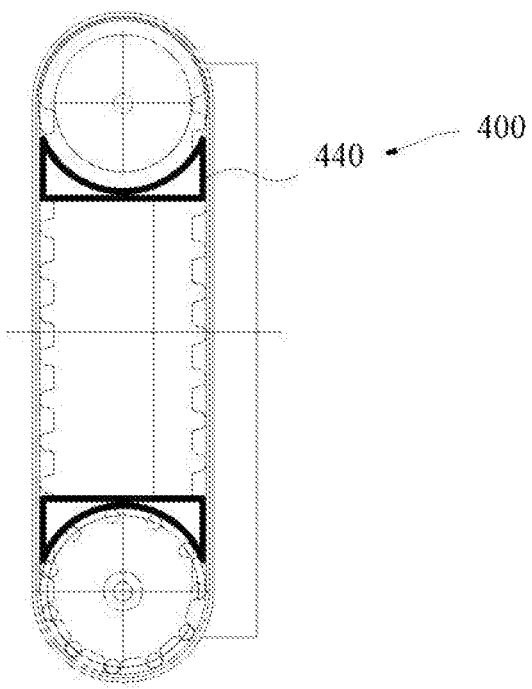
FIG. 3 is a schematic diagram of a lateral side of an autonomous track-type moving device according to another embodiment of the present invention.
Figure 4:
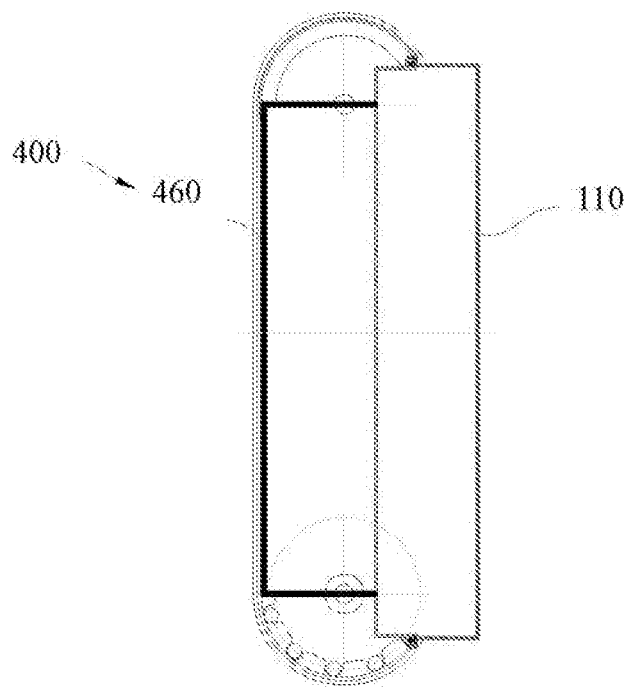
FIG. 4 is a partial schematic diagram of the autonomous track-type moving device in FIG. 3.
Figure 5:
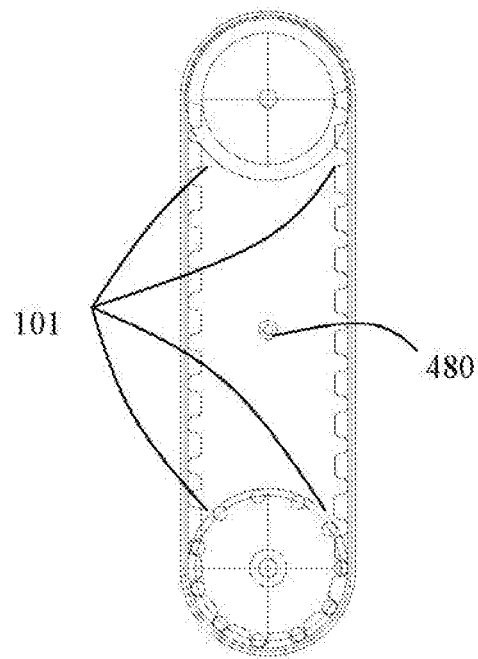
FIG. 5 is a schematic diagram of a lateral side of an autonomous track-type moving device according to still another embodiment of the present invention.

FIG. 3 and FIG. 4 show a track-type lawn mower in another specific embodiment of the present invention. The difference between this embodiment and the first embodiment is the protective mechanism 400. In this embodiment, the protective mechanism 400 includes first protective cover plates 440, and specifically, the first protective cover plates 440 are track protective cover plates. The track protective cover plates are located at outer edges of the driving wheels 120 and the guide wheels 130, are located between the guide wheels 130 and the driving wheels 120, and are fixed relative to the base 110. The track protective cover plate is used to prevent human body parts such as fingers from being drawn into the driving wheels 120 or the guide wheels 130, and then being extruded and harmed by the tracks 140 and the driving wheels 120 or the tracks 140 and the guide wheels 130.

Specifically, one end of the track protective cover plate is an arc-shaped end and the arc-shaped end matches the edge of the guide wheel 130/driving wheel 120. There are four track protective cover plates that are respectively located at the outer edges of each guide wheel 130 and each driving wheel 120. In this specific embodiment, a cutting apparatus (not shown in the figure) is disposed at a bottom of the base 110, the cutting apparatus stretches toward two sides of the base 110, and the protective mechanism 400 further includes a second protective cover plate 460 for shielding the cutting apparatus.

Specifically, the second protective cover plate 460 is a cutting apparatus protective cover plate, and the cutting apparatus protective cover plate is disposed on a side of the base 110 from which the cutting apparatus stretches outward, and is located between the driving wheel 120 and the guide wheel 130, to shield the cutting apparatus on the base 110 and prevent human body parts such as hands from reaching the cutting apparatus to be harmed.

Specifically, the second protective cover plate 460 is a hollow casing, and the cutting apparatus on the base 110 is located in an accommodation cavity formed by the casing.

Furthermore, strip-shaped slits are evenly distributed on the second protective cover plate 460, and enable the vegetation to be cut to be in contact with the cutting apparatus on the base 110.

In this specific embodiment, the track-type lawn mower is an autonomous track-type lawn mower, the track-type lawn mower further includes a controller (not shown in the figure) configured to control the track-type lawn mower to automatically walk and work, a cutting motor (not shown in the figure), and a walking motor (not shown in the figure). The controller is disposed in the base 110 and controls the cutting motor and the walking motor to rotate, and the track 140 is driven by the walking motor to drive the track-type lawn mower to walk. Under the control of the controller, the track-type lawn mower automatically walks along a preset route and turns around to avoid an obstacle, and the controller controls a rotation speed of the cutting motor according to an actual mowing condition of a lawn mowing mechanism, so that the track-type lawn mower is intelligentized.

In another embodiment, the protective mechanism 400 includes at least one sensor 480, and the sensing area of the sensor 480 covers at least the dangerous area 101. In some cases, the sensor 480 may also need to complete the sensing operation of other parts. The sensor 480 is connected to the controller, and sends a sensing signal to the controller when sensing a human body (such as a hand, a foot, or another body part) approaches. After receiving the signal, the controller immediately sends a stop instruction to the walking motor, to ensure that the track mechanism 100 stops rotation when the human body reaches the dangerous area 101, and prevent the track mechanism 100 from harming a human body in the dangerous area 101.

A quantity of sensors 480 can be selected according to a quantity of track mechanisms and the size of the sensing area. Generally, the track-type lawn mower includes two track mechanisms 100 distributed on two sides of the base 110 (that is, there are two driving wheels 120, two driven wheels, and two tracks 140). Therefore, two sensors 480 may be provided in this embodiment.

The sensor may be at least one of an infrared sensor, an ultrasonic sensor, a capacitance sensor, and a laser sensor, and certainly, the sensor in the present embodiment can also be other sensor that is not listed herein but can sense a human body.

It should be noted that, the protective mechanism of the present embodiment is also suitable for other autonomous track-type moving device. The protective mechanism 400 can not only protect a human body from being harmed by the track mechanism 100, but also prevent a foreign matter from entering the track mechanism 100, being drawn into a connection position of the track and the driving wheel 120/guide wheel 130, and damaging the track 140 or the driving wheel 120/guide wheel 130. Specifically, the protective cover plate can directly prevent a foreign matter from entering the track mechanism 100. The sensor 480 controls the track mechanism 100 to stop moving through the controller when a foreign matter enters, so that the foreign matter can be taken out directly and prevented from being drawn into the connection position of the track 140 and the driving wheel 120/guide wheel 130.

In addition, an improved track mechanism and two different implementations are further provided for the autonomous track-type moving device of the present invention.

Embodiment 1

Figure 6:
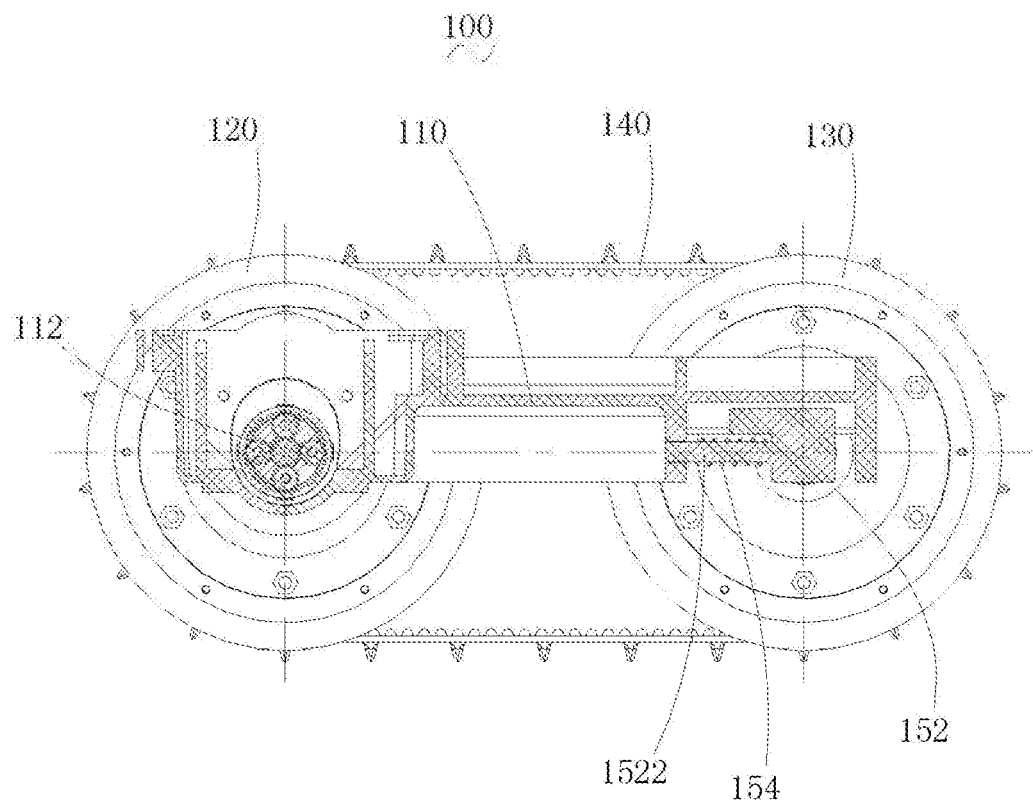
FIG. 6 is a schematic cross-sectional diagram of a track mechanism according to Embodiment 1.
Figure 7:
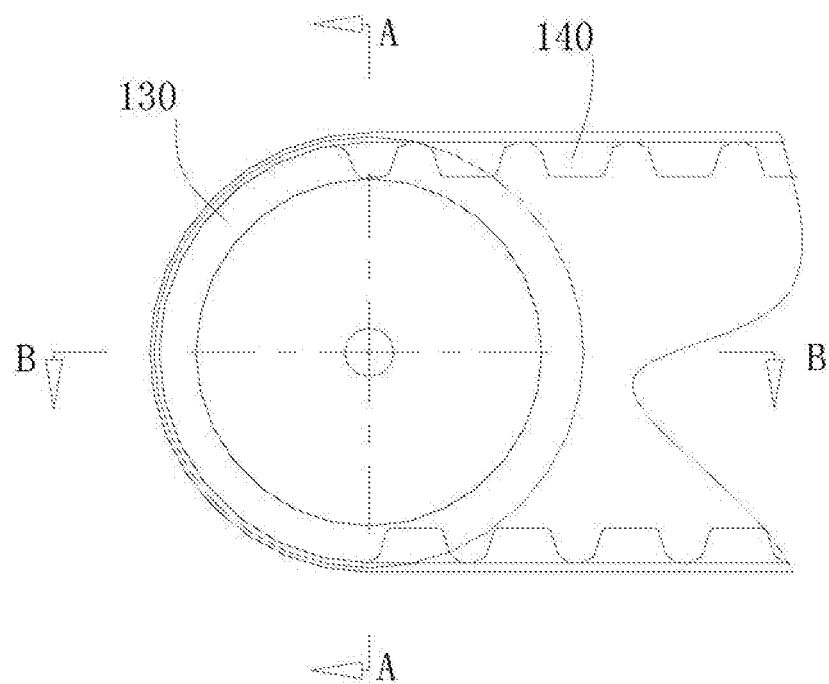
FIG. 7 is a partial lateral diagram of a track mechanism according to Embodiment 1.

Referring to FIG. 6, Embodiment 1 provides a track mechanism 100 that can be applied to various tools requiring a track mechanism. In this embodiment, for example, the tool is a lawn mower. The track mechanism is suitable for operating environments with various working conditions, and especially has a significant advantage in a workplace having a ditch or a slope. Besides, for the lawn mower using the track mechanism as a walking mechanism, since the track has a relatively large covered area on the ground, a pressure against the lawn can be reduced, thereby reducing abrasion of the lawn.

Referring to FIG. 6, the track mechanism 100 includes a base 110, a driving wheel 120, a guide wheel 130, a track 140, and a tensioning mechanism. The tensioning mechanism is configured to adjust a position of the guide wheel 130, and change the position of the guide wheel 130 immediately when the track 140 becomes loose, so that the guide wheel 130 tensions the track 140 again and prevents the track 140 from falling off.

The base 110 is a frame of the entire track mechanism 100. When the base 110 is located in the lawn mower, the base 110 can be used as a chassis of the entire lawn mower. Another element of the lawn mower, such as a mowing mechanism, can be disposed at a bottom of the base 110 to mow the lawn. Additionally, a power mechanism of the lawn mower may be disposed on the base 110, and then covered by a casing, thereby achieving a tidy and beautiful lawn mower.

The driving wheel 120 can be supported on the base 110 rotatably and is driven to rotate by a motor 112 disposed on the base 110. The motor 112 in this embodiment is an electric motor, or may be replaced by another type of motor, such as a pneumatic motor or a fuel motor. Furthermore, the motor 112 may not be mounted on the base 110 especially when the base 110 is not used as a chassis of a tool.

The guide wheel 130 and the driving wheel 120 are disposed at an interval. The track 140 is wound around the driving wheel 120 and the guide wheel 130 for a circle, to perform rotational motion around the driving wheel 120 and the guide wheel 130.

When the motor 112 drives the driving wheel 120 to rotate, the driving wheel 120 enables the track 140 to drive the lawn mower forward when performing rotational motion. The lawn mower can be turned through the motor 112 driving the driving wheel 120. Generally, at least the following two implementations are included.

Implementation 1: A pair of motors 112 is disposed. The tracks 140 on the two sides of the lawn mower are respectively disposed with a driving wheel 120 and a guide wheel 130. Each driving wheel 120 is corresponding to one motor 112 independently. When the lawn mower needs to be turned, the two motors 12 output different rotation speeds, so that the tracks 140 on the two sides of the lawn mower perform differential motion, thereby implementing turning of the lawn mower.

Implementation 2: Only one motor 112 is disposed. A differential mechanism is used to enable the tracks 140 on the two sides of the lawn mower to implement differential motion, thereby implement turning of the lawn mower.

In this embodiment, the guide wheel 130 is connected to the tensioning mechanism, to be disposed movably relative to the base 110. Furthermore, the guide wheel 130 and the driving wheel 120 are used to support the base 110 together. In other words, the guide wheel 130 is used not only as a support wheel of the base 110, but also as a tensioning wheel for tensioning the track 140, thereby simplifying a structure of the track mechanism 100 significantly.

The bottom of the driving wheel 120 and the bottom of the guide wheel 130 are on a same horizontal plane. To simplify design requirements, the radii of the driving wheel 120 and the guide wheel 130 may be configured to be consistent. Certainly, the radii of the driving wheel 120 and the guide wheel 130 may be inconsistent and designed as required. Thus, the track 140 at the bottom of the driving wheel 120 and the bottom of the guide wheel 130 extend in the plane and occupies a large area on the ground, that is, the part of the track 140 located between the driving wheel 120 and the guide wheel 130 can be used to walk on the ground.

The tensioning mechanism includes an adjusting member 152 connected to the guide wheel 130 to change the position of the guide wheel 130 and an elastic member 154 located between the adjusting member 152 and the base 110. The elastic member 154 provides a driving force that enables the adjusting member 152 to move, and the adjusting member 152 drives the guide wheel 130 to move and tension the track 140.

The elastic member 154 is configured to provide an elastic force enabling the adjusting member 152 to make linear motion relative to the base 110, and when the adjusting member 152 moves, the guide wheel 130 is driven to make linear motion. During use, when the track 140 becomes loose, and the elastic member 154 drives the adjusting member 152 and drives the guide wheel 130 to move, a wheel center distance between the guide wheel 130 and the driving wheel 120 is increased, to tension the track.

Figure 9:
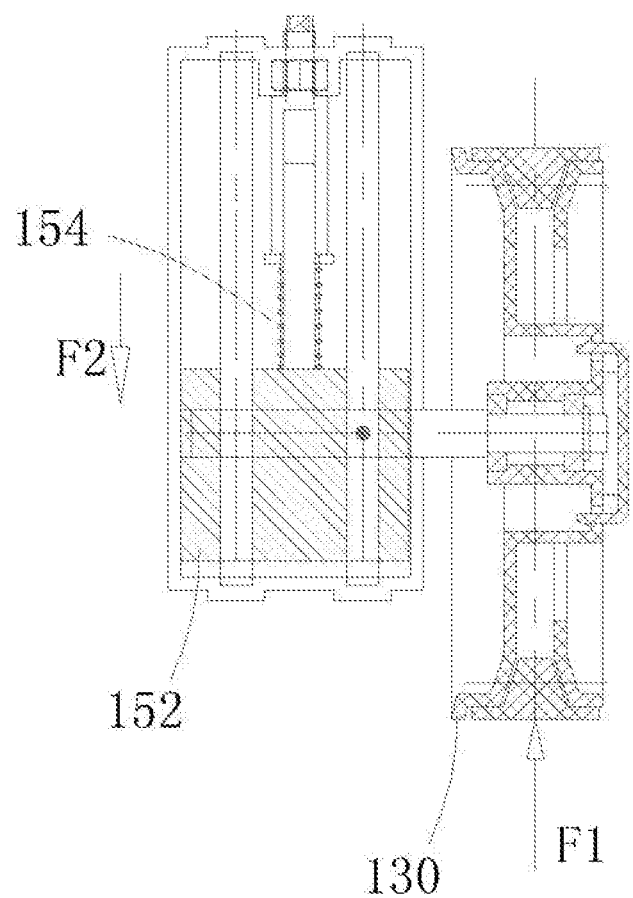
FIG. 9 is a cross-sectional diagram of the track mechanism along a line B-B in FIG. 7.

Referring to FIG. 9, a pressure provided by the track 140 for the guide wheel 130 is F1, a direction is vertically upward, and the elastic member 154 exerts a vertically downward elastic force F2 on the adjusting member 152, so that the adjusting member 152 drives the guide wheel 130 to move away from the driving wheel 120.

Referring to FIG. 6 and FIG. 9, the adjusting member 152 has a guide shaft 1522 that slidably cooperates with the base 110 in a linear direction, the elastic member 154 is disposed on the guide shaft 1522, and the two ends of the elastic member are pressed by the adjusting member 152 and the base 110 respectively. Thus, the elastic member 154 is in a pre-compressed state, to provide a pushing force enabling the adjusting member 152 to make linear motion. Certainly, the elastic member 154 can also provide a pulling force enabling the adjusting member 152 to make linear motion.

For example, a mounting position of the elastic member 154 can be changed to make the elastic member 154 be in a stretched state. When the track 140 becomes loose, a stretching degree of the elastic member 154 is reduced to tension the track 140. The elastic member 154 may be a spring sleeved on the guide shaft 1522 directly, or may be another elastic body, for example, cylindrical high-strength rubber.

Figure 8:
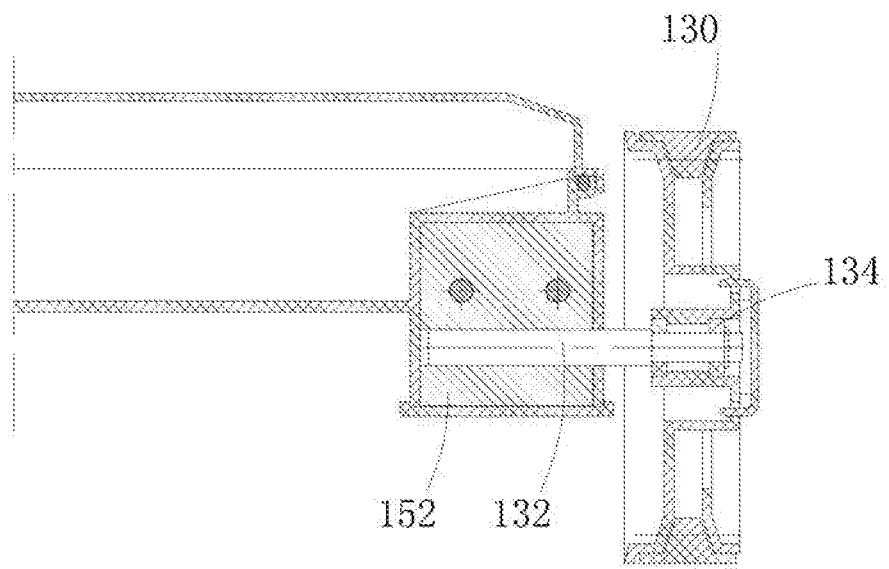
FIG. 8 is a cross-sectional diagram of the track mechanism along a line A-A in FIG. 7.

The guide wheel 130 moves along with the adjusting member 142. Referring to FIG. 8, the guide wheel 130 and the adjusting member 152 are rotatably connected through the rotating shaft 132. Thus, when the track 140 performs rotational motion, the motors 112 just need to provide a relatively small driving force to the driving wheel 120. Specifically, a bearing 134 may be disposed inside the guide wheel 130, and the rotating shaft 132 bears against the bearing 134.

The lawn mower provided in this embodiment uses the track mechanism 100. One side of the track 140 in contact with the ground has a flexible material, for example, rubber, thereby reducing abrasion caused by the track 140 to the lawn when the lawn mower is walking. The track 140 is a series closed-loop structure formed by a plurality of rubber blocks hinged through metal pins. When the track 140 performs rotary motion, mainly the rubber blocks generate torsion, thereby causing fewer noises.

The track 140 may alternatively be a plastic track or a metal track. In this case, contact between the track 140 and the ground is rigid contact. If the track 140 is made of a flexible material such as rubber, the track 140 has an elastic telescopic capability and an enhanced capability of adapting to different road conditions, and does not crack easily. During a working process of the lawn mower, if the track 140 is stretched to become loose, the elastic member 154 drives the adjusting member 152 to make linear motion, thereby making the guide wheel 130 tension the track 140 again.

Embodiment 2

Figure 10:
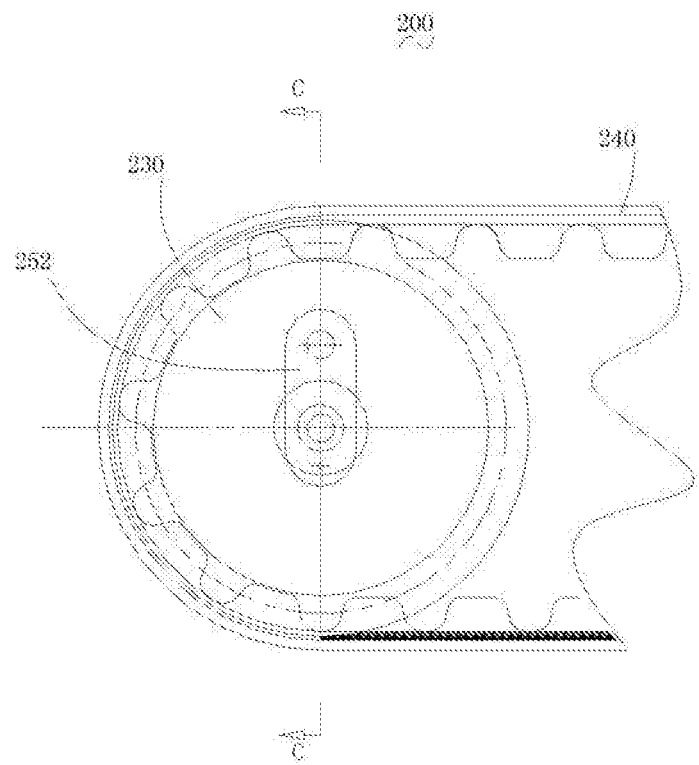
FIG. 10 is a partial lateral diagram of a track mechanism according to Embodiment 2.
Figure 11:
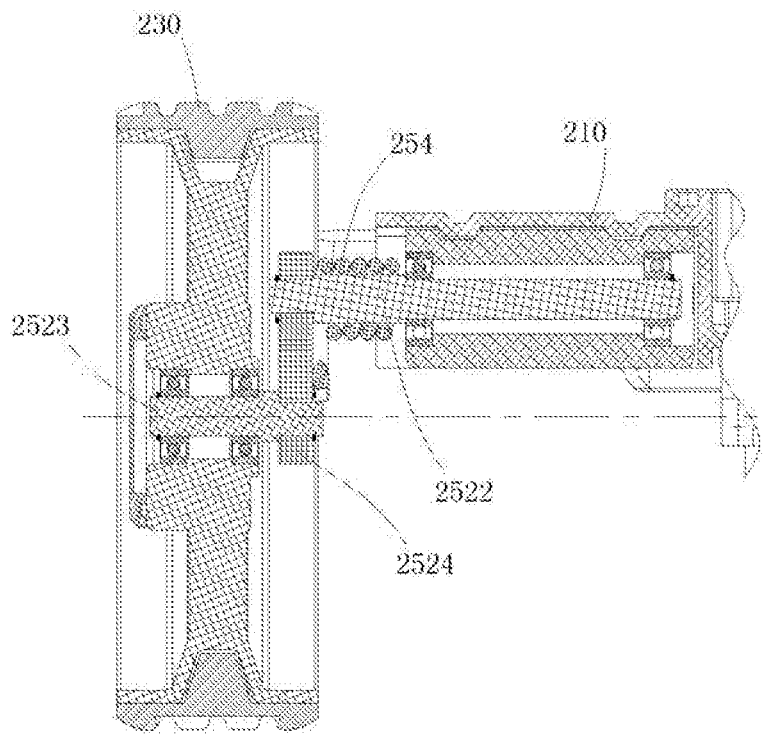
FIG. 11 is a cross-sectional diagram of the track mechanism along a line C-C in FIG. 10.

Referring to FIG. 10 and FIG. 11, Embodiment 2 provides a track mechanism 1000 that can be applied to various tools requiring a track mechanism. Similarly, the track mechanism 200 can be applied to a lawn mower. The track mechanism 1000 includes a base 110, a driving wheel (omitted and not shown), a guide wheel 230, a track 240, and a tensioning mechanism.

Similarly, the track mechanism 200 can be applied to a lawn mower, and can be used as a chassis of the entire lawn mower. The driving wheel and the guide wheel 230 are used to support the base 210 together. The bottom of the driving wheel and the bottom of the guide wheel 230 are designed to be on a same horizontal plane. The radii of the driving wheel and the guide wheel 230 may be set to be consistent. The following mainly describes differences between Embodiment 1 and Embodiment 2.

Referring to FIG. 11, the tensioning mechanism includes an adjusting member 252 and an elastic member 254. The adjusting member 252 includes a first support shaft 2522 rotatably supported on the base 210, a second support shaft 2523 rotatably supported on the guide wheel 230, and a connecting rod 2524 connecting the first support shaft 2522 and the second support shaft 2523. The first support shaft 2522 and the second support shaft 2523 are disposed eccentrically, so that a rotating axis of the adjusting member 252 on the base 110 and a rotating axis of the guide wheel 230 on the adjusting member 252 are disposed eccentrically.

The elastic member 254 is a torsion spring disposed on the first support shaft 2522, and two ends of the torsion spring bear against the connecting rod 2524 and the base 210 respectively. Thus, the elastic member 254 can provide an elastic force that can enable the adjusting member 252 to make swinging motion relative to the base 210. When the adjusting member 252 is rotating, the adjusting member 252 drives the guide wheel 230 to make swinging motion, and increases a wheel center distance between the guide wheel 230 and the driving wheel, thereby tensioning the track 240 again.

Embodiment 3

Figure 12:
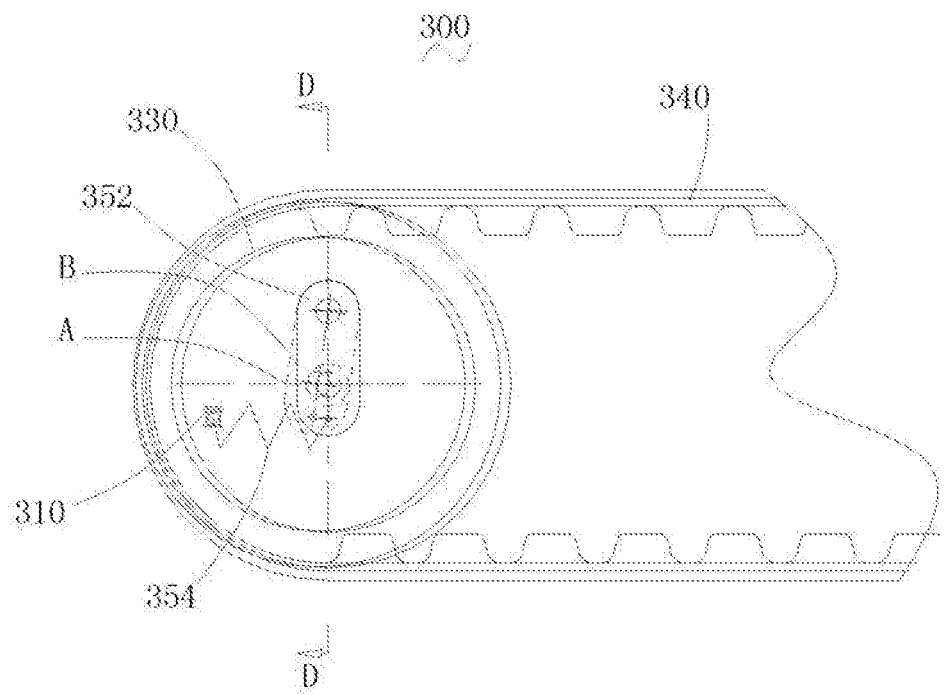
FIG. 12 is a partial lateral diagram of a track mechanism according to Embodiment 3.
Figure 13:
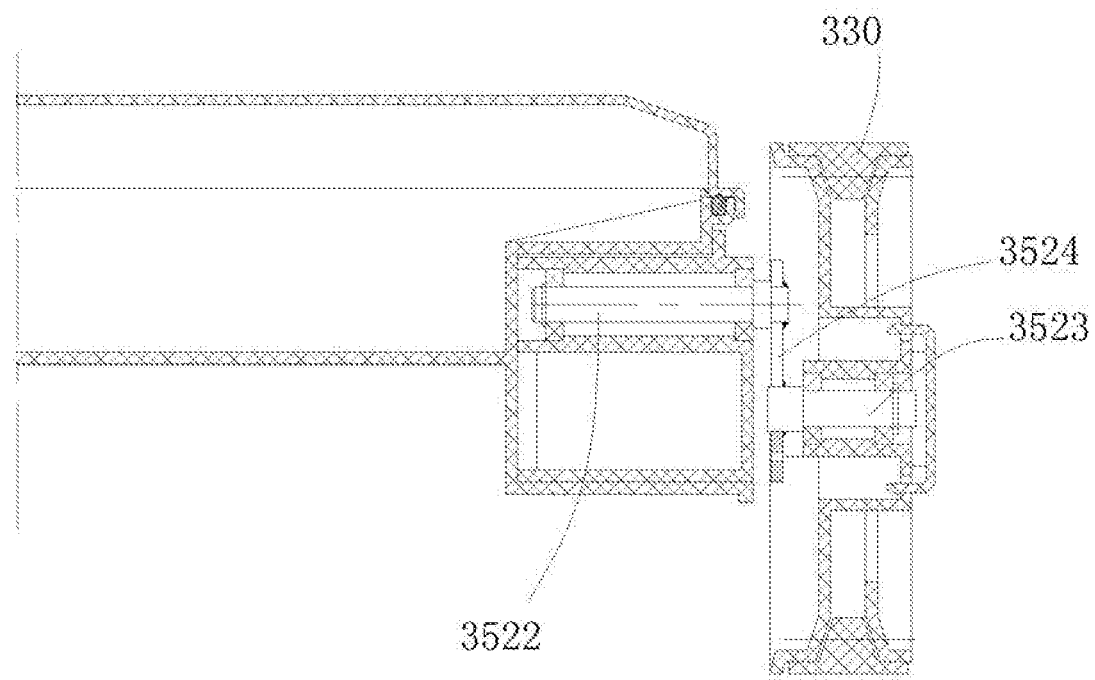
FIG. 13 is a cross-sectional diagram of the track mechanism along a line D-D in FIG. 12.

Referring to FIG. 12 and FIG. 13, Embodiment 3 provides a track mechanism 300 that can be applied to various tools requiring a track mechanism. The track mechanism 300 includes a base 310, a driving wheel (omitted and not shown), a guide wheel 330, a track 340, and a tensioning mechanism.

Similarly, the track mechanism 300 can be applied to a lawn mower and can be used as a chassis of the entire lawn mower. The driving wheel and the guide wheel 330 are used to support the base 310 together. The bottom of the driving wheel and the bottom of the guide wheel 330 are designed to be on a same horizontal plane. The radii of the driving wheel and the guide wheel 330 may be set to be consistent. The following mainly describes differences between Embodiment 3 and Embodiment 2.

Referring to FIG. 13, the tensioning mechanism includes an adjusting member 352 and an elastic member 354. The adjusting member 352 includes a first support shaft 3522 rotatably supported on the base 310, a second support shaft 3523 rotatably supported on the guide wheel 330, and a connecting rod 3524 connecting the first support shaft 3522 and the second support shaft 3523. The first support shaft 3522 and the second support shaft 3523 are disposed eccentrically, so that a rotating axis of the adjusting member 352 on the base 310 and a rotating axis of the guide wheel 330 on the adjusting member 350 are disposed eccentrically.

The elastic member 354 is a tension spring connected between the connecting rod 3524 and the base 310. Specifically, the elastic member 354 is disposed on one side of the connecting rod 3524 and is away from the driving wheel (the driving wheel not shown in FIG. 12 is located on the right side of the guide wheel 330).

When the track 340 becomes loose, the elastic member 354 provides an elastic force that enables the adjusting member 352 to make swinging motion relative to the base 310, and the elastic force is a pulling force. The axis by which the adjusting member 352 makes swinging motion is the first support shaft 3522. Certainly, if a mounting position of the elastic member 354 is changed, the elastic force may alternatively be a pushing force.

Referring to FIG. 12, when the track 340 is not mounted on the guide wheel 330, a position of the adjusting member 352 is indicated by a position A in FIG. 12. Since the guide wheel 330 is not pressed by the track 340 and the elastic member 354 is not stretched, the adjusting member 352 is configured to turn left by an angle relative to the plumb line. The angle can be eight degrees. When the track 340 is mounted, after the guide wheel 330 is pressed by the track 340, the adjusting member 352 swings, then moves to a position B and stretches the elastic member 354, and at the position B, the connecting rod 3524 extends along the plumb line.

When the track 340 becomes loose, a pressure on the guide wheel 330 becomes small. Since the elastic member 354 is previously in a stretched state, the elastic member 354 can pull the adjusting member 352 to swing clockwise during a process of reducing the stretching length, and when the adjusting member 352 swings, the adjusting member 352 drives the guide wheel 330 to make swinging motion and increases a wheel center distance between the guide wheel 330 and the driving wheel, thereby tensioning the track again.

Technical features in the foregoing embodiments can be combined randomly, and for brief description, not all possible combinations of the technical features in the foregoing embodiments are described. However, the combinations of the technical features shall be considered to fall within the scope of the disclosure of the specification provided that the combinations are not contradictory.

The foregoing embodiments only represent several implementations of the present invention and are described specifically and in detail, but cannot be construed as a limitation to the scope of the invention patent. It should be noted that, a person of ordinary skill in the art can make several variations and modifications without departing the conception of the present invention, and the variations and modifications all fall within the protection scope of the present invention. Therefore, the protection scope of the present invention shall depend on the appended claims.

What is claimed is:

1. A track mechanism for an autonomous moving device, comprising:
   a base;
   a driving wheel rotatably disposed on the base;
   a guide wheel, configured to support the base together with the driving wheel and disposed movably relative to the base;
   a track, wound around the driving wheel and the guide wheel, to perform rotary motion around the driving wheel and the guide wheel; and
   a tensioning mechanism, including an adjusting member connected to the guide wheel configured to change a position of the guide wheel and an elastic member located between the adjusting member and the base, the elastic member provides a driving force that enables the adjusting member to move, and the adjusting member drives the guide wheel to move and tension the track
   wherein the elastic member provides an elastic force that enables the adjusting member to perform swinging motion relative to the base, and when the adjusting member is moving, the adjusting member drives the guide wheel to perform swinging motion.

2. The track mechanism according to claim 1, wherein the elastic member provides a pushing force or a pulling force that enables the adjusting member to move.

3. The track mechanism according to claim 1, wherein when the elastic member drives the adjusting member and drives the guide wheel to move, a wheel center distance between the guide wheel and the driving wheel is increased.

4. The track mechanism according to claim 1, wherein a bottom of the driving wheel and a bottom of the guide wheel are on a same horizontal plane.

5. The track mechanism according to claim 1, wherein the guide wheel and the adjusting member are connected rotatably through a rotating shaft.

6. The track mechanism according to claim 1, wherein the adjusting member is rotatably connected to the base, the guide wheel is rotatably connected to the adjusting member, and a rotating axis of the adjusting member on the base and a rotating axis of the guide wheel on the adjusting member are set eccentrically.

7. The track mechanism according to claim 1, wherein the adjusting member includes a first support shaft rotatably supported on the base, a second support shaft rotatably supported on the guide wheel, and a connecting rod connecting the first support shaft and the second support shaft.

8. The track mechanism according to claim 7, wherein the elastic member is a torsion spring disposed on the first support shaft, and two ends of the torsion spring bear against the connecting rod and the base respectively.

9. The track mechanism according to claim 7, wherein the elastic member is connected between the connecting rod and the base.

10. The track mechanism according to claim 1, wherein a motor for driving the driving wheel to rotate is further disposed on the base.

11. The track mechanism according to claim 1, wherein the track is a series closed-loop structure formed by a plurality of rubber blocks hinged through metal pins.

12. The track mechanism for an autonomous moving device of claim 1, wherein the device is a lawn mower.

13. The lawn mower according to claim 12, wherein the track has a flexible material on one side in contact with a ground.

* * * * *